United States Patent Office 2,769,822
Patented Nov. 6, 1956

2,769,822

PREPARING Δ⁴-3-KETO-ETIENIC ACIDS

Virgil W. Gash, Dayton, Ohio, assignor to Monsanto Chemical Company, St. Louis, Mo., a corporation of Delaware No Drawing. Application May 26, 1954,
Serial No. 432,591

8 Claims. (Cl. 260—397.1)

This invention relates to the preparation of etianic acids. In some of its aspects, the invention pertains to a method of selective oxidation of steroids containing a $C_{17}$ acetyl group without affecting other functional groups, such as a $\Delta^4$-3-keto system, an 11-keto group, a 17α-hydroxyl group, unsaturation in any of the rings including the D ring, and the like.

Etianic acids, also called etiocholanic acids, constitute a known class of compounds. They are valuable intermediates in the preparation of various hormones. For example, $\Delta^4$-3-keto-etienic acid can be converted into the adrenal cortical hormone, desoxycorticosterone acetate (Wilds U. S. 2,538,611; Wilds and Shunk J. Am. Chem. Soc., 70, 2427 (1948)).

In the present application, the term "etianic acids," unless specifically indicated to be limited, is employed generically to designate saturated and unsaturated 17-carboxylic acids of the etianic and alloetianic acid series, which acids may or may not contain substituent groups on the nucleus. Likewise, the terms "pregnane-20-one compounds" and "pregnane-20-ol compounds," unless specifically indicated to be limited, are employed generically to designate saturated and unsaturated 20-keto and 20-hydroxy compounds, respectively, of the pregnane and allopregnane series, which compounds may or may not contain substituent groups on the nucleus.

The present invention provides a simple one-step method for the formation of etianic acids from certain compounds of the pregnane series, viz. 20-keto and 20-hydroxy pregnane compounds. The invention is applicable to treatment of said compounds wherein the 21-carbon atom is substituted with functional groups, for example hydroxy, halo, acetoxy, and the like. However, it is seldom found desirable to degrade such compounds to the corresponding 17-carboxylic acids, e. g., the corresponding etianic acids, as such $C_{21}$ substituted compounds are usually desired end products in themselves. A generally more useful type of compound to convert to the corresponding etianic acid has the methyl group constituting the 21-position unsubstituted. The preferred types of compounds, therefore, to which the present invention is to be applied, constitute the pregnane-20-one compounds and pregnane-20-ol compounds that are unsubstituted at $C_{21}$.

In accordance with the present invention, a pregnane-20-one compound or a pregnane-20-ol compound is reacted with a hypobromite or a hypoiodite, resulting in degradation of the $C_{17}$ side chain to form the corresponding etianic acid. This reaction occurs in a single treatment step, with good yields of the etianic acid product. An important aspect of the invention resides in the fact that a wide variety of functional groups in or on the rings of the starting steroid compound are unaffected. Thus, it is unnecessary to protect any double bond present in any of the rings, including the D ring, as must so often be done in other processes for degrading $C_{17}$ side chains. Further, functional groups such as 17α-hydroxy, or 11-keto, or 3-keto, or halogen, or acyloxy, or alkoxy, or ethylenedioxy (cyclic ketals), and the like, are unaffected.

The reaction can be effected in a very simple manner, as for example by contacting the chosen pregnane-20-one compound or pregnane-20-ol compound starting material with an aqueous solution of a hypobromite, in the presence of a co-solvent such as t-butanol or other inert oxygenated organic solvent, at ordinary room temperature. Use of less than the stoichiometric quantity of the hypobromite per mole of starting pregnane-20-one or pregnane-20-ol compound tends to give low yields based on the starting compound, but high yields based on the hypobromite. Theoretically, three mole-equivalents of hypobromite are necessary for complete reaction of a 20-keto compound, and four mole-equivalents of hypobromite are necessary for complete reaction of a 20-hydroxy compound. It will be understood, of course, that three mole-equivalents of hypobromite would constitute three moles of a monovalent hypobromite, such as sodium hypobromite, or one and one-half moles of a divalent hypobromite, such as calcium hypobromite, etc. An excess of hypobromite over the stoichiometric quantity is preferred and not harmful. For example, a two-fold or three-fold excess is suitable, i. e., twice or thrice the stoichiometric quantity. The reaction can be represented, in the case of sodium hypobromite and a pregnane-20-one compound, as follows:

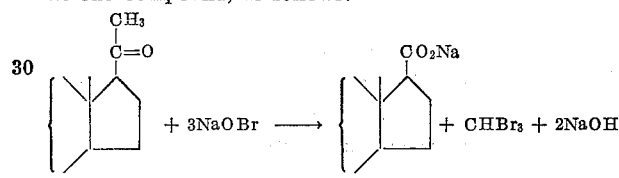

While almost any amount of any inert solvent can be used, so long as the reaction mixture does not become so dilute so as to reduce the extent of reaction too severely for good yields, it is preferred to use a water-miscible co-solvent, and in amounts only sufficient to bring the starting steroid and the hypobromite into intimate reacting contact. Thus, it is helpful to start with a one-phase reaction system. However, this is not essential since the salt of the product etianic acid is water-soluble and after the reaction has progressed to some extent the reaction mixture tends to be homogeneous. While ordinary room temperature, e. g. 20° C. is quite suitable, the reaction can be effected over a considerable range of temperature, for example from —10 to +70 or +80° C. In particularly reactive systems, it is often preferred to start in the cold, followed by warming. A reaction time varying from a few minutes, e. g., 15 minutes, to a few hours, e. g. 6 hours, will be chosen, the shorter times being used with the higher temperatures.

Suitable solvents are those which are inert under the conditions of use, and especially inert organic solvents that exhibit partial or complete miscibility with water. Especially preferred are inert oxygenated organic solvents, for example, diethyl ketone, tertiary butanol, dioxane, glycerol ethers such as 1,2,3-trimethoxypropane, ethylene glycol diethers such as methylated butyl Cellosolve, diethylene glycol diethers such as diethyl Carbitol, tetrahydrofuran, and the like.

In most instances, it is preferred to use the hypobromites rather than the hypoiodites, although the latter are operable and the statements given herein with specific reference to the hypobromites are also applicable to the corresponding hypoiodites. The water-soluble hypobromites and hypoiodites, especially those of the alkali metals, e. g., sodium, potassium, lithium, etc., and of the alkaline earth metals, e. g. calcium strontium, etc., are preferred. The hypobromites or hypoiodites are ordinarily prepared in dilute alkaline aqueous solutions, for instance in solutions containing 90 parts water and 10 parts hypobromite plus any excess alkali. It will be understood that when reference is made to the production of the etianic acids, it is intended to include the production of the salts of the etianic acids as well as the free acids.

By way of example, but not limitation, the following pregnane-20-one and pregnane-20-ol compounds can be subjected to reaction with hypobromite or hypoiodite, resulting in each case in the formation of the corresponding compound where the $C_{17}$ side chain has been degraded to the $C_{17}$ carboxylic acid, i. e., wherein the compound has been converted to the corresponding etianic acid.

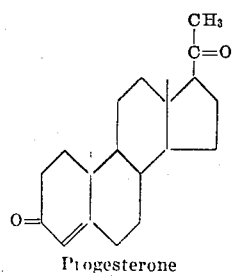

Progesterone

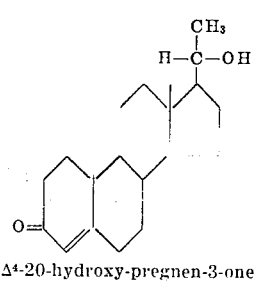

$\Delta^4$-20-hydroxy-pregnen-3-one

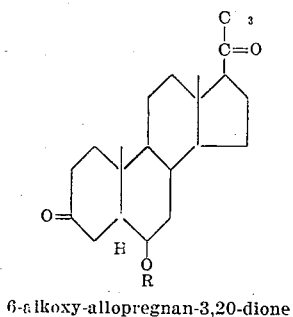

6-alkoxy-allopregnan-3,20-dione

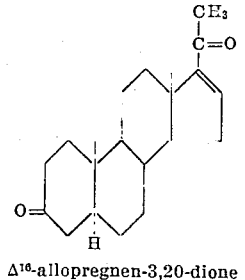

$\Delta^{16}$-allopregnen-3,20-dione

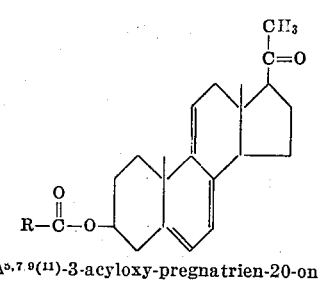

$\Delta^{5,7,9(11)}$-3-acyloxy-pregnatrien-20-one

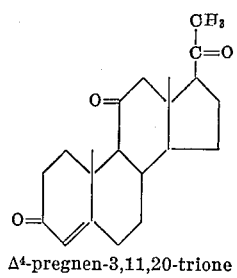

$\Delta^4$-pregnen-3,11,20-trione

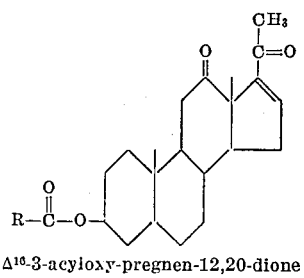

$\Delta^{16}$-3-acyloxy-pregnen-12,20-dione

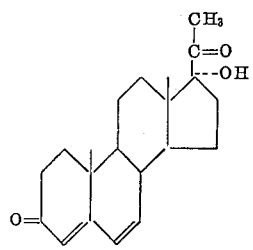

$\Delta^{4,6}$-17$\alpha$-hydroxy-pregnadien-3,20-dione

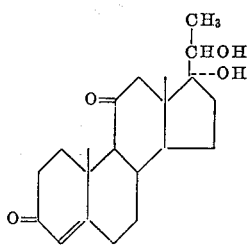

$\Delta^4$-17$\alpha$,20-dihydroxy-pregnen-3,11-dione

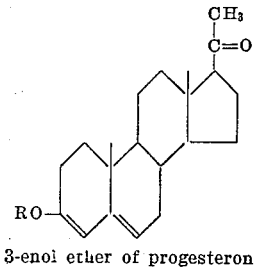

3-enol ether of progesterone

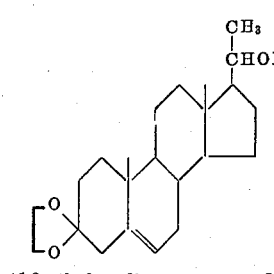

$\Delta^5$-3-ethylenedioxy-pregnene-20-ol

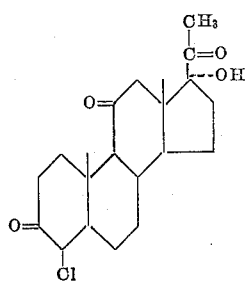

4-chloro-17α-hydroxy-pregnan-3,11,20-trione

In the foregoing formulae, R represents a hydrocarbon radical such as, for example, a lower alkyl, e. g. methyl, ethyl, isopropyl, isobutyl, t-butyl, n-butyl, sec.-butyl, or an aryl or aralkyl, e. g., phenyl, tolyl, benzyl.

The following examples illustrate application of the invention to progesterone. With the same reagents and at the same conditions, the other specific compounds named herein and the classes of compounds named herein are likewise converted to the corresponding etianic acids, although of course the same yields will not be obtained in each case. It will be understood that variations can be made in the precise details given in the examples, without departing from the invention.

Example 1

A solution of 3.6 g. of sodium hydroxide in 30 ml. water was cooled to 0° C. and 5.6 g. of bromine was added dropwise while the temperature was kept between 0 and 10° C. A solution of 3.14 g. of progesterone in 15 ml. tert.-butyl alcohol was added dropwise to the stirred hypobromite solution with the temperature maintained at 0–10° C. An additional 15 ml. of tert.-butyl alcohol was added and the solution was stirred at 0–10° C. for 30 minutes, then warmed to 30° C. and stirred for 3 hours. The solution was diluted with 25 ml. water followed by addition of sufficient aqueous sodium thiosulfate to destroy excess hypobromite. At this point, the orange mixture had separated into two layers. After the addition of 100 ml. of water, the mixture was extracted with ether yielding only a negligible amount of an oil upon evaporation of the ether. The aqueous solution was acidified with concentrated hydrochloride acid yielding 2.34 g. of $\Delta^4$-3-ketoetienic acid, M. P. 246–250° C.

Infrared analysis showed carbonyl absorption at $5.81\mu$ (carboxylic group), $\alpha,\beta$-unsaturated carbonyl group at $6.08\mu$ and $6.21\mu$, and an inflection at $3.2\mu$ for the hydroxyl of the carboxylic group. Ultraviolet absorption occurred at $$\lambda_{max}^{alc.}\ 244\ m\mu$$

The analytical sample was obtained as long slender needles from aqueous ethanol, M. P. 249–253° C.

*Analysis.*—Calcd. for $C_{20}H_{28}O_3$: C, 75.91; H, 8.92. Found: C, 75.96; H. 8.97.

Example 2

A stirred solution of 18 g. (0.45 mole) of sodium hydroxide in 150 ml. distilled water was cooled to 2° C. and bromine (9.6 g., 0.06 mole) was added dropwise with the temperature at 0 to 10° C. A solution of 15.7 g. (0.05 mole) of progesterone in 150 ml. of tert.-butanol was added dropwise to the cooled hypobromite solution. After being stirred at 0–10° C. for thirty minutes, the solution was warmed to 30° C. and stirred for 2 hours. The mixture (2 layers) was diluted with water and extracted with ether. The ether extract, after drying and distillation of solvent, yielded 3.36 g. of recovered unreacted progesterone.

The stirred aqueous alkaline solution was cooled in an ice bath and acidified slowly with concentrated hydrochloric acid. After overnight refrigeration the solution was filtered yielding 5.86 g. of washed and dried $\Delta^4$-3-ketoetienic acid, M. P. 215–230° C. A small sample was recrystallized from aqueous ethanol, M. P. 245–8° C.

A solution of 4.80 g. (15.17 milli-mole) of the $\Delta^4$-3-ketoetienic acid in 30.13 ml. of 0.5035 N sodium hydroxide was added to 200 m. benzene and the stirred mixture was distilled to effect complete removal of water. The benzene was decanted and the residue was washed with acetone yielding 5.14 g. of the sodium salt.

In this example, a slight excess over one mole equivalent of hypobromite was used, whereas the stoichiometric quantity for complete conversion of the progesterone is 3 mole equivalents. Thus, the yield of etienic acid was only 37 percent based on progesterone, but was over 90 percent based on the amount of hypobromite used. This, plus the recovery of unreacted progesterone, indicates a minimum of side reactions.

While the invention has been described with particular reference to various preferred embodiments thereof, it will be appreciated that numerous modifications and variations are possible without departing from the invention.

I claim:

1. A method of preparing a $\Delta^4$-3-keto-etienic acid which comprises reacting a steroid selected from the group consisting of $\Delta^4$-pregnene-3,20-dione compounds and $\Delta^4$-pregnene-3-one-20-ol compounds with a hypohalite selected from the group consisting of hypobromites and hypoiodities resulting in degradation of the $C_{17}$ side chain to form the corresponding $\Delta^4$-3-keto-etienic acid.

2. A method of preparing $\Delta^4$-3-keto-etienic acid which comprises reacting progesterone with a hypobromite resulting in degradation of the $C_{17}$ side chain to form said $\Delta^4$-3-keto-etienic acid.

3. A method of preparing a $\Delta^4$-3-keto-etienic acid which comprises reacting a $\Delta^4$-pregnene-3,20-dione compound with an aqueous solution of a hypobromite of a metal selected from the group consisting of the alkali and alkaline earth metals, resulting in degradation of the $C_{17}$ side chain to form the corresponding $\Delta^4$-3-keto-etienic acid.

4. Method according to claim 3 wherein said hypobromite is sodium hypobromite.

5. Method according to claim 3 wherein progesterone is reacted with said hypobromite to form $\Delta^4$-3-keto-etienic acid.

6. Method of preparing a $\Delta^4$-3-keto-etienic acid which comprises reacting a $\Delta^4$-pregnene-3,20-dione compound with an aqueous solution of a hypobromite of a metal selected from the group consisting of the alkali and alkaline earth metals, in the presence of an inert oxygenated organic solvent, and at a temperature within the range of —10 to +80° C., resulting in degradation of the $C_{17}$ side chain to form the corresponding $\Delta^4$-3-keto-etienic acid.

7. Method according to claim 6 wherein progesterone is reacted with an alkali metal hypobromite to form $\Delta^4$-3-keto-etienic acid.

8. Method according to claim 1 wherein said hypohalite is an alkali metal hypobromite.

References Cited in the file of this patent

UNITED STATES PATENTS 2,171,959     Bockmuhl _____ Sept. 5, 1939

FOREIGN PATENTS 506,515     Great Britain _____ 1939